United States Patent [19]
Ziu et al.

[11] Patent Number: 5,400,828
[45] Date of Patent: Mar. 28, 1995

[54] DOUBLE-CONTAINMENT PIPING SUPPORTS FOR IMPROVED ANNULUS FLOW

[75] Inventors: Christopher G. Ziu, 227 E. Lafayett St. Easton, Pa. 18042; Themistocli Ziu, Fairfield, Conn.

[73] Assignee: Christopher G. Ziu, Merrimack, N.H.

[21] Appl. No.: 88,864

[22] Filed: Jul. 8, 1993

[51] Int. Cl.⁶ ............................................. F16L 9/18
[52] U.S. Cl. ................................... 138/113; 138/111; 138/114
[58] Field of Search ............... 138/108, 111, 113, 114, 138/115; 285/133.1; D12/204, 205, 208, 133

[56] References Cited

U.S. PATENT DOCUMENTS

| | | | |
|---|---|---|---|
| D. 256,688 | 9/1980 | Zielinski | D12/205 |
| D. 257,615 | 12/1980 | Horikoshi | D12/205 |
| 361,276 | 4/1987 | Macfarlane | . |
| 1,023,530 | 4/1912 | Schofer | 138/114 |
| 1,497,652 | 6/1924 | Browne | . |
| 2,181,664 | 11/1939 | Melzer | 174/99 |
| 2,280,140 | 4/1942 | Wilson | 138/111 |
| 2,551,710 | 5/1951 | Slaughter | 285/133.1 |
| 2,572,955 | 10/1951 | Schumacher | 98/56 |
| 2,791,019 | 3/1954 | Du Laney | 25/118 |
| 2,890,724 | 6/1959 | Kennedy, Jr. | 138/65 |
| 2,938,569 | 5/1960 | Goodrich | 154/41 |
| 2,963,539 | 12/1960 | Hynes | 174/138 |
| 3,349,168 | 10/1967 | Rehder et al. | 174/99 |
| 3,374,308 | 3/1968 | Haas | 174/138 |
| 3,789,129 | 1/1974 | Ditscheid | 174/28 |
| 4,100,367 | 7/1978 | Netzel | 174/28 |
| 4,121,858 | 10/1978 | Schulz | 285/13 |
| 4,335,267 | 6/1982 | Hopkins | 138/108 |
| 4,400,019 | 8/1983 | Fruck | 285/55 |
| 4,423,778 | 1/1984 | Goldsmith | 166/134 |
| 4,478,278 | 10/1984 | Klein | 166/105 |
| 4,754,782 | 7/1988 | Grantham | 138/115 |
| 4,786,088 | 11/1988 | Ziu | 285/138 |
| 4,804,158 | 2/1989 | Collins et al. | 248/74.4 |
| 4,930,544 | 6/1990 | Ziu | 138/113 |
| 5,018,260 | 5/1991 | Ziu | 24/555 |
| 5,085,471 | 2/1992 | Ziu | 285/133.1 |

FOREIGN PATENT DOCUMENTS

| | | | |
|---|---|---|---|
| 1354210 | 1/1994 | France | 138/111 |
| 1296781 | 3/1987 | U.S.S.R. | 138/115 |

*Primary Examiner*—David A. Scherbel
*Assistant Examiner*—Terrence R. Till
*Attorney, Agent, or Firm*—McCormick, Paulding & Huber

[57] ABSTRACT

A centering support for a double-containment piping assembly has a body portion including an inner surface defining a central aperture for receiving and supporting the inner pipe within the outer pipe, and the inner surface is defined by a first radius of curvature. A plurality of support lugs are spaced apart from each other and project outward from the body portion, and each support lug defines an outer support surface for contacting the outer pipe. The support lugs also define corresponding recessed surfaces extending between adjacent support lugs, and each recessed surface is defined by a second radius of curvature substantially concentric with the first radius of curvature.

5 Claims, 4 Drawing Sheets

DOUBLE-CONTAINMENT PIPING SUPPORTS FOR IMPROVED ANNULUS FLOW

FIELD OF THE INVENTION

The present invention relates to double-containment piping assemblies including inner piping components mounted within outer piping or containment components, and more particularly, piping supports, such as interstitial centering supports or internal anchors for mounting inner piping components within outer piping or containment components.

BACKGROUND INFORMATION

Co-axial piping systems, in which inner pipes are contained within outer pipes, have been used for many years in various applications, such as in heat exchangers, jacketed process piping systems and insulated piping systems. Each of these types of co-axial piping systems have different operating requirements and considerations. In heat exchangers and jacketed process pipes, there is typically fluid flowing through the annulus between the inner and outer piping under laminar flow conditions to maximize the thermal transfer between the piping components and the fluid. In insulated systems, on the other hand, an insulating medium is placed within the annulus between the inner and outer piping components, and thus there is no fluid flow through the annulus.

Typical double-containment piping assemblies include inner piping components mounted within outer piping components, and are intended to transport hazardous or dangerous fluids within the inner piping. If there is a leak in the inner piping, the outer piping is intended to collect any such leakage. The annulus between the inner and outer piping components is normally dry, and it is known to mount leak detection equipment within the annulus to detect the presence of any fluid within the annulus indicating a leak. These types of double-containment piping assemblies have gained popularity only in recent years, which is believed to be due at least in part to legislation enacted in the United States, and similar legislation that has been enacted, or is under consideration in many other countries. In the United States, this legislation includes the Resource Conservation and Recovery Act, which became effective in about 1988, and affects underground piping systems, and the Spill Prevention Control and Countermeasure Rules (SPCC) of the Clean Water Act of 1990, which affect aboveground piping systems.

The requirements of these types of double-containment assemblies are different than the requirements of prior co-axial piping systems, such as jacketed process pipes and double-wall heat exchangers, in several major respects. The annulus in a double-containment piping assembly is intended to be dry, and must be maintained substantially bone dry in many instances in order to avoid false readings by leak detection equipment. If a leak does occur in a double-containment piping assembly, it is necessary to thoroughly flush and then dry the annulus between the inner and outer piping components in order to ensure that the annulus is thoroughly decontaminated.

The flushing and decontamination procedure typically includes the following steps: 1) draining the annulus by safely removing the leaking fluid through low-point drains; 2) flushing a fluid, such as water and/or a neutralizing acid/base, through the annulus to thoroughly decontaminate the annulus and render the system safe for repair and/or maintenance (which may also be required by OSHA rules in the United States); and 3) thoroughly drying the annulus before and after repair of the piping, and before placing the piping back in service. Drying is normally accomplished by introducing dry air (sometimes heated air in order to increase the rate at which moisture is absorbed), nitrogen, or other inert gas, usually at relatively high flow rates through the annulus in order to increase the rate of drying.

During this decontamination process, "fully turbulent flow" (e.g., Reynolds number greater than approximately 10,000) of both the liquid and gas through the annulus is desirable for more effective decontamination. In prior co-axial piping systems, such as conventional jacketed process piping systems and double-wall heat exchanger applications, on the other hand, the systems are designed to have a more laminar flow (e.g., Reynolds number less than 1,000) in order to facilitate heat transfer through the annulus. Typically, interstitial supports, or other structures mounted within an annulus of a co-axial piping system tend to create a frictional resistance to fluid flow. Generally, the greater the obstruction and/or frictional resistance, the more substantial is the decrease in the rate of fluid flow through the annulus, and the more laminar (or less turbulent) is the flow. The shapes of supports in double-containment piping assemblies, such as interstitial supports and internal anchor supports, and the shapes and relative dimensions of apertures formed in such supports for permitting fluid flow through the annulus of a double-containment piping assembly, are therefore critical considerations in controlling the nature of any fluid flow through the annulus. These considerations have generally gone unrecognized in double-containment piping assemblies to date.

With collar-type interstitial supports, a substantial portion of the inner and outer peripheries of the supports are maintained in contact with the walls of the inner and outer piping. As a result, with collar-type supports there is a relatively even load distribution between the inner and outer piping. With vane-type supports, on the other hand, there is a ring portion that surrounds the inner piping, or is coupled between sections of inner piping, and a plurality of relatively narrow vanes projecting outward from the ring portion and contacting the outer piping for supporting the inner piping within the outer piping. Because the vanes are relatively narrow in width, the load created by the inner piping resting on the inner wall of the outer piping is concentrated into point loads where the relatively narrow vanes contact the outer piping. The load distribution is therefore not as uniform or even as with collar-type interstitial supports. This is particularly the case when there are relatively few narrow vanes, e.g., five or less vanes, each vane occupying less than an approximately 5 degree section of the annular surface of the fitting, or having a thickness of schedule 80 piping or less.

This type of load (and stress) concentration is amplified when there are movements of the primary piping relative to the containment piping due, for example, to differential thermal expansion or contraction, vibrations, or when there are soil loads on the containment piping, or vehicular traffic loads on the soil above the containment piping, which force the containment piping against the vanes of the support. These types of loads, which can be cyclical, can erode or gouge the areas of contact of the vanes against the containment piping, which can in turn degrade the structural integrity of the containment piping, and lead to failure. A failure of this type in underground installations can cause contamination of ground water supplies.

These difficulties arising from stress concentration become more acute when notch-sensitive materials are employed to form the outer piping, e.g., high-density polyethylene, polypropylene, polyvinylidene fluoride, glass-reinforced epoxy and glass-reinforced vinyl ester, each of which are commonly used to form outer piping in double-containment assemblies. These same difficulties occur when the outer piping is formed from certain frangible materials, and non-ductile materials at low temperatures.

Although these drawbacks associated with stress concentration are typically not encountered with collar-type supports, the collar-type supports known to date define circular, semi-circular, or tangential (or chord) cutouts in the outer peripheries of the fittings for permitting fluid flow through the annulus between the inner and outer piping. These cutouts typically define a relatively small area within the annulus, and therefore tend to substantially decrease the fluid flow rate through the annulus, and lessen the turbulence of the flow. These types of fittings are therefore not best suited for facilitating flushing of the annulus for decontamination following leakage.

Collar-type supports have not been used in most conventional jacketed process piping systems and double-walled heat exchangers, typically because the piping is made of carbon steel or stainless steel, and the systems operate at temperatures in which these materials are ductile. Vane-type supports have normally been preferred in these types of systems because laminar flow enhances thermal transfer, and stress concentration is not a serious consideration.

If a vane-type support were employed in a double-containment assembly, however, not only would there be difficulties associated with stress concentration, as described above, but "vortice shedding" can occur. When fluid flows through a vane-type support, a vortex is typically formed on the downstream side of the support, and a hollow area (i.e., no fluid flow) is thus formed on the downstream side of the support. If a critical flow is achieved (depending upon the flow rate and vibrational characteristics of the piping assembly), the vortices induce vibrations in the piping assembly. If the natural harmonic frequency of the piping assembly is achieved, catastrophic failure can occur.

Although collar-type supports typically avoid vortice shedding, and more uniformly distribute the loads transmitted between the inner and outer piping in comparison to vane-type supports, the annular cutout geometry provided to date in collar-type supports does not enhance, and may prevent fully-turbulent flow in the annulus for cleaning and drying operations necessary for proper decontamination.

SUMMARY OF THE INVENTION

The present invention is directed to supports for double-containment piping assemblies, such as interstitial supports or internal anchor supports, with means for improving fluid flow through the annulus between the inner and outer piping.

In one embodiment, the present invention is directed to a support comprising a body portion including an inner surface defining a central aperture for receiving and supporting the inner pipe within the outer pipe, wherein the inner surface is defined by a first radius of curvature. A plurality of support lugs are spaced apart from each other and project outward from the body portion, and each support lug defines an outer support surface for contacting the outer pipe. The support lugs also define corresponding recessed surfaces extending between adjacent support lugs, and each recessed surface is defined by a second radius of curvature substantially concentric with the first radius of curvature.

In one embodiment of the present invention, each outer support surface of the support lugs is defined by a third radius of curvature substantially concentric with the first and second radii of curvature. Each outer support surface occuppies a sector of a circle defining an angle within the range of approximately 5 to 10 degrees. Each support lug also defines two side surfaces on substantially opposite sides of the support lug relative to each other, and each side surface extends between one end of the respective support surface and the respective recessed surface.

In one embodiment of the present invention, at least one side surface is sloped toward an adjacent lug in the direction from the upstream side of the support toward the downstream side of the support. In another embodiment of the present invention, at least one sloped surface curves inward toward an adjacent support lug in the direction from the upstream side of the support toward the downstream side of the support. The support lugs may also each define an inner lug surface located on a substantially opposite side of the support lug relative to the respective outer support surface, and defining at least one flow channel between the support lug and the inner pipe.

In another embodiment of the present invention, the body portion includes a first end and a second end separated from the first end. A first flange portion is coupled to the first end, and a second flange portion is coupled to the second end, and a fastener, or other means for coupling, extends through the flange portions to couple the flange portions together and clamp the support to the inner pipe.

In another embodiment, the present invention is also directed to a support for a double-containment piping assembly, comprising an inner body portion for coupling to the inner piping, and an outer body portion spaced apart from and surrounding the inner body portion for coupling to the outer piping. A plurality of support legs extend between the inner body portion and the outer body portion, and are substantially equally spaced relative to each other, defining a plurality of flow channels between the support legs for fluid flow through the support. Each support leg is defined by a first curved surface extending between the inner body portion and the outer body portion, and a second curved surface located on a substantially opposite side of the support leg relative to the first curved surface and extending between the inner body portion and the outer body portion, forming a curved support leg.

One advantage of the supports of the present invention, is that the spacing of the support lugs or support legs relative to each other provides a greater amount of open area for the flow of fluid through the supports in comparison to prior art supports. This increase in area for fluid flow permits fully-turbulent flow, and enhances the ability of the fluid to decontaminate the annulus between the inner and outer piping in the event of leakage.

Another advantage of the supports of the present invention is that the side surfaces of the support lugs or support legs can be sloped, curved and/or tapered to cause a swirling effect on the fluid flowing through the flow channels, increasing the turbulence of the fluid, and further enhancing the ability to adequately decontaminate the annulus between the inner and outer piping in the event of leakage.

Other advantages of the present invention will become apparent in view of the following detailed description and accompanying drawings.

DETAILED DESCRIPTION

Figure 1:
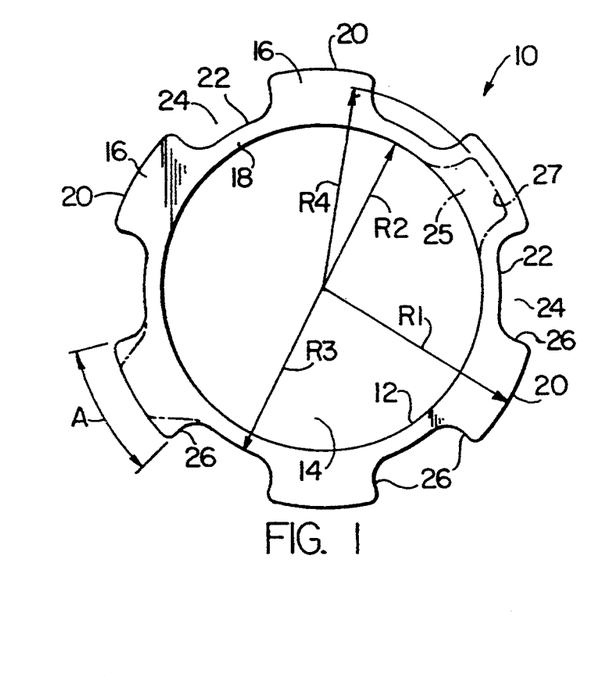
FIG. 1 is a front plan view of an interstitial centering support embodying the present invention for supporting inner piping within outer piping in a double-containment assembly and providing improved fluid flow through the annulus between the inner and outer piping.

In FIG. 1, an interstitial centering support embodying the present invention is indicated generally by the reference numeral 10. The support 10 includes a substantially circular inner surface 12 defining a central aperture 14 for receiving an inner pipe, as illustrated in dashed lines in FIG. 2. The diameter of the aperture 14 is slightly larger than the outside diameter of the inner pipe so that the inner pipe can be received within the support, and the support can be appropriately positioned with respect to the inner and outer piping. A plurality of support lugs 16 project outward from a ring portion 18 of the support, and are substantially equally spaced relative to each other along the outer periphery of the support. Each lug 16 defines a bearing surface 20 for contacting the inner surface of the outer piping, illustrated in dashed lines in FIG. 2, to support the inner piping against the outer piping and axially-guide the inner piping within the outer piping.

The support 10 is preferably attached to the primary piping by welding or bonding, for example, along the interface of the surface 12 and the inner piping. In this instance, the support lugs are not attached to the outer piping, but rather are permitted to move relative to the outer piping for axial movement of the inner piping relative to the outer piping. If desired, however, the support lugs 16 can be attached to the outer piping by welding or bonding, for example, and the inside surface 12 is not attached to the inner piping, but rather is permitted to move relative to the inner piping for axial movement of the inner piping relative to the outer piping.

A plurality of corresponding recessed surfaces 22 are formed between the support lugs 16 on the outside surface of the support, defining a plurality of flow channels 24 located between the support lugs 16 for fluid flow through the annulus between the inner and outer piping. As shown in FIG. 1, the bearing surfaces 20 of each lug 16 are defined by a radius R1, which is slightly less than the radius of the inside surface of the outer piping in order to be received within and substantially conform to the curvature of the outer piping. The diameter defined by the radius R1 should be sufficiently less than the inside diameter of the outer piping in order to permit the outer piping to be diametrically deflected up to approximately 5%, in order to avoid the outer piping from becoming stressed against the bearing surfaces 20 when the double-containment system is underground.

The inside surface 12 is defined by a radius R2, which, as described above, is slightly greater than the radius of the outside surface of the inner piping to receive the inner piping. As also shown in FIG. 1, each recessed surface 22 is defined by a radius R3, which is less than the radius R1 and greater than the radius R2. The radii R1, R2 and R3 are substantially concentric. The difference between R2 and R3 is the thickness of the ring portion 18. The width of each support lug 16 is defined by an angle A, i.e., the sector of the circle occupied by the respective lug. The angle A is preferably within the range of approximately 5 to 10 degrees, in order to avoid the drawbacks described above with narrow vanes, yet maximize the open area defined by the flow channels 24 for fluid flow through the annulus between the inner and outer piping.

Each lug 16 defines side surfaces 26, and each pair of opposing side surfaces 26 and adjacent recessed surface 22 define a respective flow channel 24. As shown in FIG. 1, the junction between the ends of each side surface 26 and the adjacent bearing surface 20 and recessed surface 22 are defined by curved surfaces to avoid points of concentrated stress within the support.

One advantage of the centering support 10 of the present invention, is that because the curvature of each of the recessed surfaces 22 corresponds to the curvature of each of the bearing surfaces 20 and to the curvature of the inner surface 12, the space defined by each flow channel 24 is greater than in prior art centering supports in which the flow channels are formed by semi-circular cutout(s) in the outer surface of the support. Because of this increase in open area for fluid flow, the centering support of the present invention permits fully-turbulent flow through the flow channels 24 and through the annulus between the inner and outer piping, in order to facilitate flushing and drying of the annulus for decontamination, for example.

If desired, rather than being substantially straight, the side surfaces 26 can each be formed with a gradual taper, i.e., tapering inward generally toward the center of the respective bearing surface 20 in the direction from the recessed surface 22 to the bearing surface, as illustrated typically in dashed lines in FIG. 1. This optional feature further increases the open area defined by the flow channels 24, and thus further enhances turbulent fluid flow through the annulus.

Figure 2:
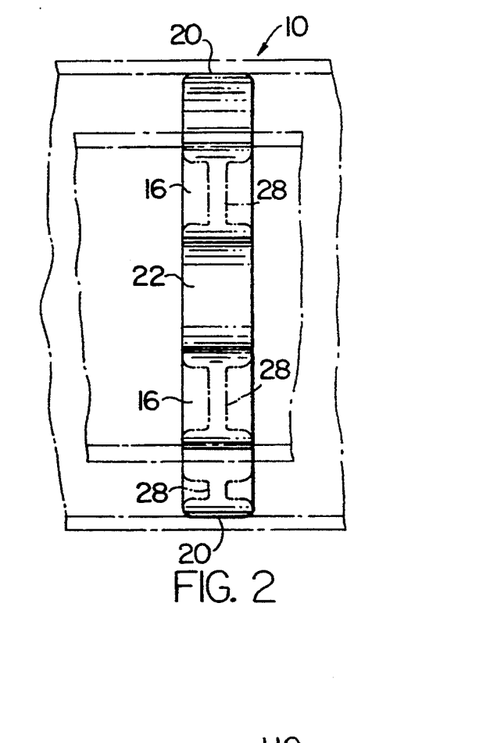
FIG. 2 is a side plan view of the interstitial centering support of FIG. 1.

It may also be desirable to form recesses 28 in the front and back faces of the lugs 16, as illustrated typically in dashed lines in FIG. 2. This feature is advantageous when the centering support 10 is cast or injection molded, since it would decrease the amount of material necessary to manufacture each support, and would increase the structural strength of the support by forming a generally I-beam cross-section in each lug 16, as illustrated in dashed lines in FIG. 2.

Another option, particularly when the support 10 is cast or injection molded, is to form the ring portion 18 and each lug 16 of a substantially uniform cross-sectional thickness, thus forming additional flow channels 25 located between each lug 16 and the inner piping, as illustrated typically in dashed lines in FIG. 1. In this instance, the inside surface 27 of each lug is defined by a radius R4, which is greater than the radius R2 of the inner surface 12, and less than the radius R1 of each bearing surface 20. The radius R4 is preferably concentric with the other radii illustrated in FIG. 1. One advantage of this feature, is that it significantly increases the open flow area, now defined by both the flow channels 24, and the corresponding flow channels 25 located between each pair of flow channels 24. The corners defining each flow channel 25 are preferably curved in order to avoid any potentially destructive stress concentration within the centering support.

Figure 3:
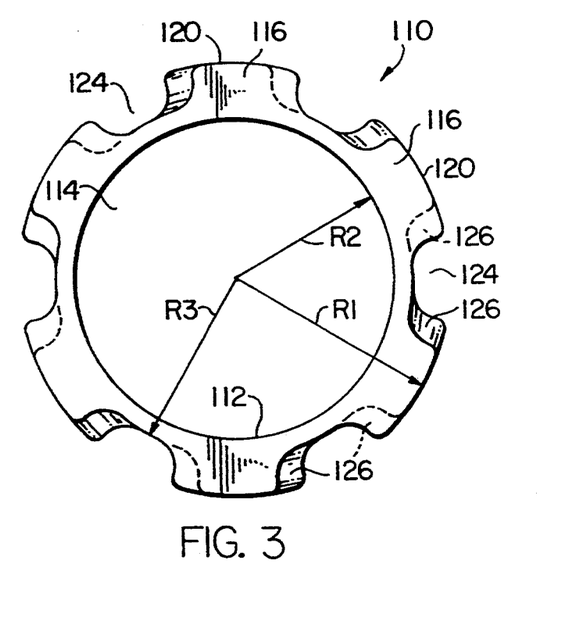
FIG. 3 is a front plan view of another embodiment of an interstitial centering support of the present invention in which the support lugs define sloped side surfaces for enhancing the turbulence of the fluid flow through the flow channels of the support.
Figure 4:
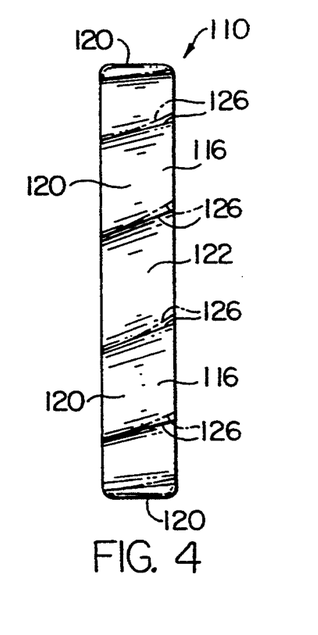
FIG. 4 is a side plan view of the centering support of FIG. 3.

In FIGS. 3 and 4, another embodiment of a centering support of the present invention is indicated generally by the reference numeral 110. The centering support 110 is similar to the centering support 10, and therefore like reference numerals preceded by the numeral 1 are used to indicate like elements.

The centering support 110 differs from the centering support 10 in that the side surfaces 126 of each lug 116 are sloped outward toward the opposing lug in the direction from the front (or upstream) side of the support toward the back (or downstream) side of the support, as illustrated in FIGS. 3 and 4. The tapered surfaces 126 on either side of each lug 116 are preferably substantially parallel to each other, as also shown in FIG. 4. This orientation of the lugs 116 directs the fluid flowing through the flow channels 124 in a substantially curved path, causing a swirling effect, and tending to increase the turbulence on the downstream side of the support, and thus facilitating in flushing and/or drying the annulus between the inner and outer piping.

As an option, each of the side surfaces 126 may define a slight curvature, as illustrated in dashed lines in FIG. 4, sloping toward the adjacent lug from the front (or upstream) side of the support toward the back (or downstream) side of the support and in a generally counter-clockwise direction. This configuration further enhances the turbulence of the fluid flow through the annulus to facilitate thorough decontamination when flushing the annulus.

Figure 5:
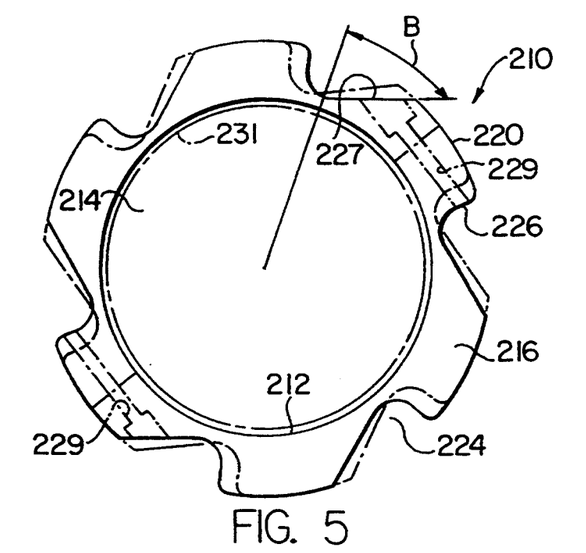
FIG. 5 is a front plan view of another embodiment of an interstitial centering support of the present invention in which the support lugs define tapered side surfaces for enhancing the turbulence of the fluid flow through the flow channels of the support.

In FIG. 5, another embodiment of a centering support of the present invention is indicated generally by the reference numeral 210. The support 210 is similar to the support 10 described above in connection with FIGS. 1 and 2, and therefore like reference numerals preceded by the numeral 2 are used to indicate like elements.

The support 210 differs from the support 10 in that one side surface 227 of each lug 216 tapers outward from approximately the base of one lug to the bearing surface 220 of the adjacent lug. The front (or upstream) edge of each side surface 227 is oriented at an angle B with respect to the normal of the outside surface of the support. Each surface 226 on the substantially opposite side of each lug 216 with respect to the tapered surface 227, is oriented approximately normal to the outside surface of the fitting, or at a lesser angle relative to the normal than the angle B.

It may also be desirable to orient each side surface 227 so that it tapers inward toward the adjacent lug 216 in the direction from the front (or upstream) side of the support toward the back (or downstream) side of the fitting, and to taper each side surface 226 so that it likewise tapers away from the opposing wall of the adjacent lug in the direction from the front (or upstream) side of the support toward the back (or downstream) side of the support, as indicated in dashed lines in FIG. 5. This orientation causes the fluid to swirl as it passes through the flow channels 224, and enhances the turbulence of the fluid to facilitate flushing and/or drying of the annulus for decontamination. A swirling flow of fluid is typically more effective in flushing and drying the annulus, as opposed to an axial flow, or more laminar flow through the annulus.

As also illustrated in dashed lines in FIG. 5, the support 210 can be split into halves, and define counterbored apertures 229 extending through the halves of the lugs 216 on the ends of the halves. Fasteners can then be inserted through the apertures 229 to couple the halves of the support together. An elastomeric lining 231 can also be mounted on the inner surface 212 to dampen any vibrational movements of the inner pipe, as also illustrated in dashed lines in FIG. 5.

Figure 6:
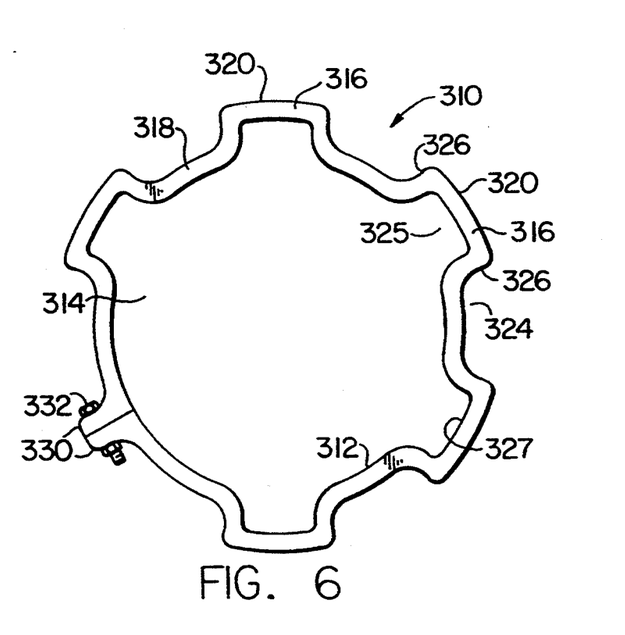
FIG. 6 is a front plan view of another interstitial centering support of the present invention defining additional flow channels within the support lugs for increasing the open area for fluid flow through the support.

In FIG. 6, another embodiment of a centering support of the present invention is indicated generally by the reference numeral 310. The support 310 is similar to the support 10 described above in connection with FIG. 1, and therefore like reference numerals preceded by the numeral 1 are used to indicate like elements.

The centering support 310 differs from the centering support 10 in that the support 310 is split through the body portion at in at one location, and includes a pair of opposing flange portions 330 and a fastener 332 extending through the flange portions 330 to couple the flanges together and clamp the support onto an inner pipe. If the support is made from a sufficiently flexible material, it does not have to be slipped over one end of the inner piping, but rather the fastener 332 is removed and the flanges 330 are pulled away from each other to open the support. The support can then be slipped onto the inner piping, and once the flanges 330 are released, the support will close over the piping. The fastener 332 is then coupled through the flanges 330 to secure the support to the inner piping.

As also shown optionally in FIG. 1, the support 310 defines a substantially uniform cross-sectional thickness in the radial direction, and defines a plurality of second flow channels 325 located between flow channels 324, and extending between each lug 316 and the inner piping.

Figure 7:
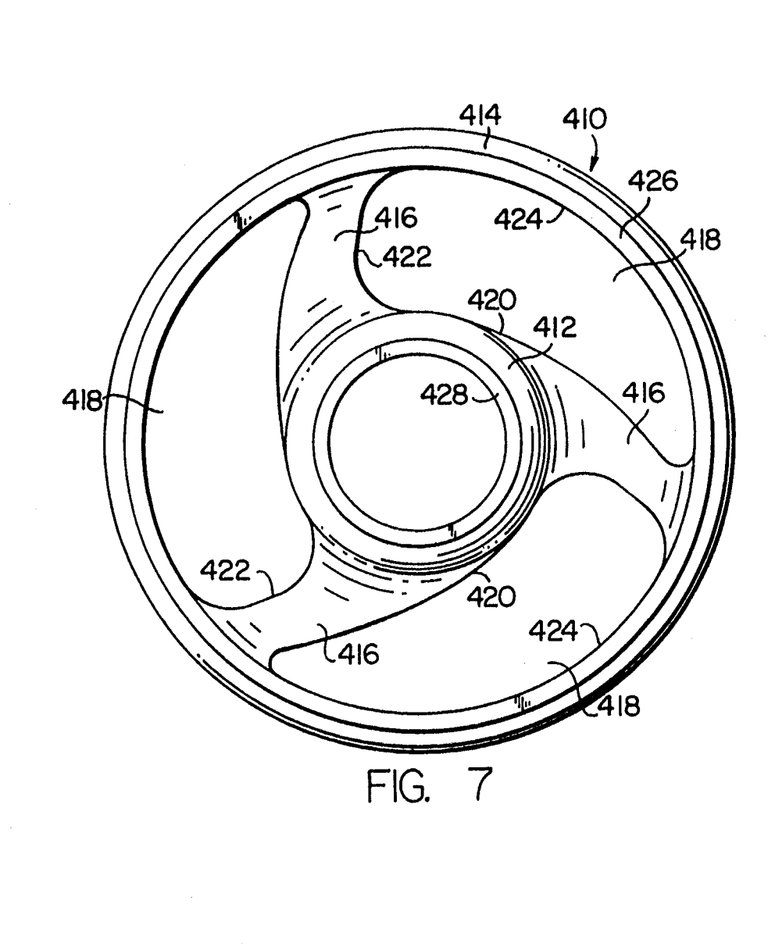
FIG. 7 is a front plan view of an internal anchor support embodying the present invention, including curved legs extending between the inner and outer body portions of the support and defining the flow channels through the support.
Figure 8:
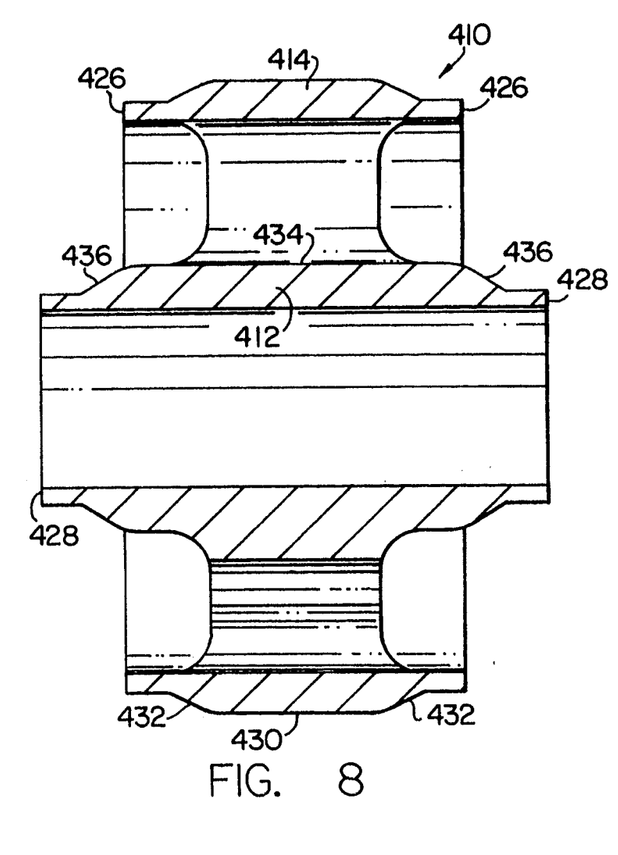
FIG. 8 is a cross-sectional view of the support of FIG. 7.

In FIGS. 7 and 8, an embodiment of an internal anchor support of the present invention is indicated generally by the reference numeral 410. The anchor support 410 includes an inner body portion 412, an outer body portion 414, and a plurality of legs 416 coupled between the inner and outer body portions. As shown in FIG. 7, there are three legs 416 substantially equally spaced relative to each other within the annulus between the inner and outer body portions, defining flow channels 418 between the legs 416. Each leg 416 is defined by a first convex curved surface 420 extending from approximately the base of the adjacent leg 416 on the inner body portion 412 to the outer body portion 414, and a second concave curved surface 422 located on the substantially opposite side of the leg 416 relative to the first curved surface, and extending between the base of the respective leg 416 on the inner body portion to the outer body portion. Each flow channel 418 is thus defined by a respective first curved surface 420, a second curved surface 422 on the adjacent leg 416, and an inside wall 424 of the outer body portion 414. As shown in FIG. 7, the junctures between the ends of each of the first and second curved surfaces 420 and 422, respectively, and the inner and outer body portions are defined by curved surfaces to avoid points of concentrated stress, which might otherwise decrease the structural integrity of the support.

The outer body portion 414 defines a pair of flange portions 426 on either end of the outer body portion for attachment to corresponding sections of outer piping (not shown). The inner body portion 412 similarly defines a pair of flange portions 428 on either end of the inner body portion for attachment to corresponding sections of inner piping (not shown). As shown in FIG. 7, each flange portion 426 and 428 defines a substantially flat end surface for butt joining to the corresponding sections of inner and outer piping. As will be recognized by those skilled in the art, numerous other configurations may be employed for attachment to corresponding sections of inner and outer pipe, such as socket connections.

The outer body portion 414 defines an outer raised annular portion 430 extending between the flange portions 426 for increasing the structural strength of the outer body portion. Each end of the outer raised annular portion 430 is defined by a tapered surface 432 extending between the outer surface of the annular portion 430 and the respective flange portion 426. As shown in FIG. 8, the two surfaces 432 are tapered in substantially opposite directions relative to each other to uniformaly distribute stress within the outer body portion.

The inner body portion 412 defines an inner raised annular portion 434 extending between the flange portions 428 for increasing the structural strength of the inner body portion. Each end of the inner raised annular portion 434 is defined by a tapered surface 436 extending between the outer surface of the inner annular portion 434 and a respective flange portion 428. As shown in FIG. 8, the two surfaces 436 are tapered in substantially opposite directions relative to each other to uniformaly distribute stress within the outer body portion.

One advantage of the anchor support 410 of the present invention, is that because each leg 416 is defined by curved surfaces 420 and 422, and thus defines a curved shape extending between the inner body portion and the outer body portion, the structural strength of the support is significantly increased in comparison to a support with straight legs (or vanes) extending between the inner and outer body portions. This design maximizes both the open flow area through the support (defined by the flow channels 418), and the structural strength of the support due to the curved (or arched) configuration of the legs extending between the inner and outer body portion.

If desired, the surfaces 420 and 424 can be tapered to create curved flow channels through the support, which in turn create a swirling effect on the fluid flowing through the support, in order to increase the turbulence of the flow and enhance the ability to flush the annulus for decontamination. For example, the surfaces 420 and 424 can be tapered inward from the outer body portion toward the inner body portion in the direction from the front (or upstream) side of the support to the back (or downstream) side of the support to create curved flow channels.

Figure 9:
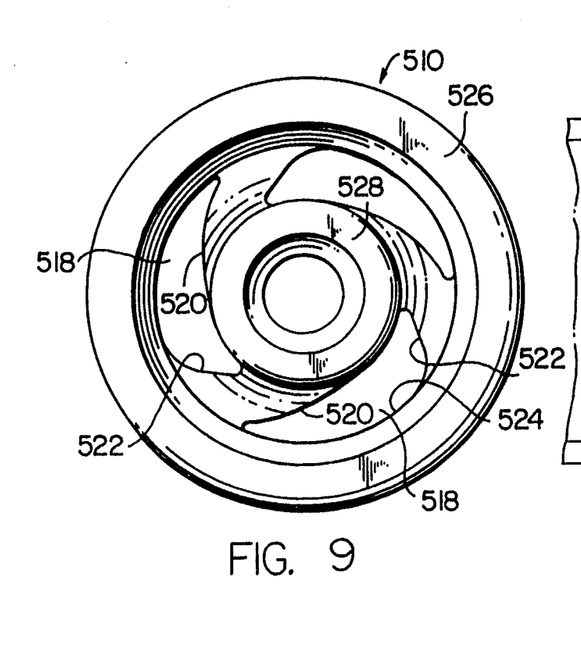
FIG. 9 is a front plan view of another embodiment of an internal anchor support of the present invention including socket connections for attachment to corresponding sections of inner and outer piping.
Figure 10:
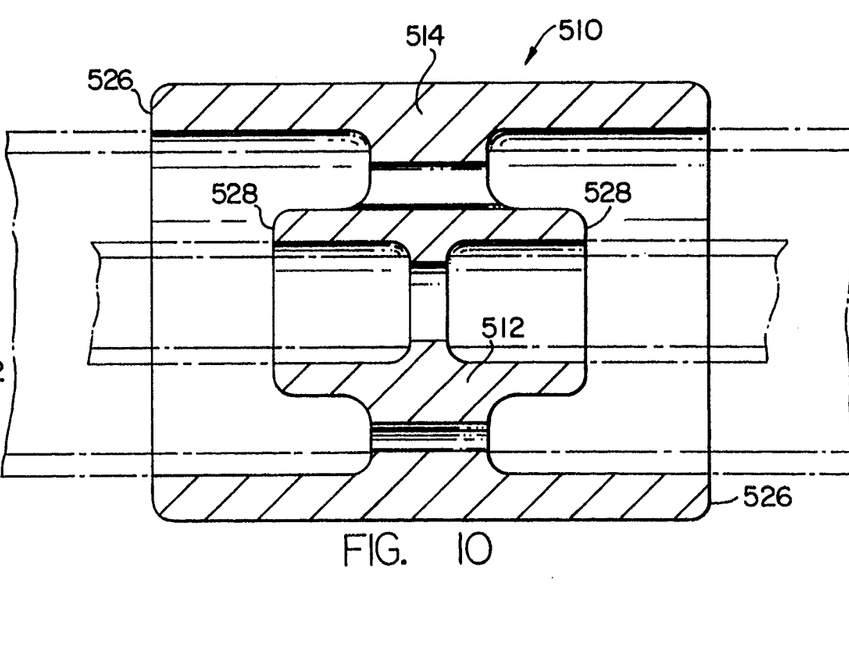
FIG. 10 is a cross-sectional view of the internal anchor support of FIG. 9.

Turning to FIGS. 9 and 10, another embodiment of an anchor support of the present invention is indicated generally by the reference numeral 510. The support 510 is similar to the support 410 described above with reference to FIGS. 7 and 8, and therefore like reference numerals preceded by the numeral 5 instead of the numeral 4 are used to indicate like elements.

The anchor support 510 differs from the support 410 in that the flange portions 526 and 528 of the outer and inner body portions, respectively, define socket connections for socket joining to corresponding straight sections of piping, as indicated in dashed lines in FIG. 10. The inner piping is received within the sockets formed by the inner flange portions 528 and the outer piping is received within the sockets formed by the outer flange portions 526.

Because the outer body portion 514 and inner body portion 512 each define a generally thicker cross-section than the outer body portion 414 and inner body portion 411 of the support 410, the inner and outer body portions of the fitting 510 do not include raised inner and outer annular portions, although such raised annular portions could be added, if desired.

We claim:

1. A support for a double-containment piping assembly having inner piping mounted within outer piping, comprising:

an inner body portion for coupling to the inner piping, and an outer body portion spaced apart from and surrounding the inner body portion for supporting the inner piping in a spaced apart relationship with respect to the after piping and a plurality of support legs extending between the inner body portion and the outer body portion, the support legs being spaced relative to each other and defining a plurality of flow channels between the support legs for fluid flow through the support, each support leg being defined by a first convex curved surface extending between the inner body portion and the outer body portion and a second concave curved surface located on a substantially opposite side of the support leg relative to the first curved surface and extending between the inner body portion and the outer body portion.

2. A support as defined in claim 1, wherein each first curved surface slopes away from the second curved surface on an adjacent support leg in the direction from the inner body portion toward the outer body portion.

3. A support as defined in claim 2, wherein each of the first and second curved surfaces defines a base adjacent to the inner body portion, and each first curved surface extends from the base of the second curved surface of the adjacent leg on the inner body portion to the outer body portion.

4. A support as defined in claim 1, wherein each second curved surface is substantially parallel to the corresponding opposite portion of the respective first curved surface.

5. A support as defined in claim 1, wherein each flow channel defines an unobstructed space throughout the respective flow channel.

* * * * *

UNITED STATES PATENT AND TRADEMARK OFFICE
CERTIFICATE OF CORRECTION

PATENT NO. : 5,400,828
DATED : March 28, 1995
INVENTOR(S) : Christopher G. Ziu

It is certified that error appears in the above-identified patent and that said Letters Patent is hereby corrected as shown below:

Column 10

Line 52, the word "after" should be --outer--.

Signed and Sealed this

Twenty-seventh Day of June, 1995

Attest:

BRUCE LEHMAN

Attesting Officer       Commissioner of Patents and Trademarks